US012417717B2

(12) United States Patent
Mohl (10) Patent No.: US 12,417,717 B2
(45) Date of Patent: Sep. 16, 2025

(54) DYNAMIC BREATHING SIMULATOR

(71) Applicant: Government of the United States, as represented by the Secretary of the Air Force, Wright-Patterson AFB, OH (US)

(72) Inventor: David Mohl, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 707 days.

(21) Appl. No.: 17/865,450

(22) Filed: Jul. 15, 2022

(65) Prior Publication Data

US 2023/0048758 A1    Feb. 16, 2023

Related U.S. Application Data (60) Provisional application No. 63/231,348, filed on Aug. 10, 2021.

(51) Int. Cl.
   *G09B 23/32*      (2006.01)
(52) U.S. Cl.
   CPC ..................... *G09B 23/32* (2013.01)
(58) Field of Classification Search
   CPC ...................................................... G09B 23/32
   See application file for complete search history.

(56) References Cited

U.S. PATENT DOCUMENTS

| | | | | |
|---|---|---|---|---|
| 2,207,153 A | * | 7/1940 | Judovich | G09B 23/285 434/272 |
| 3,849,909 A | * | 11/1974 | Ravin | G09B 23/28 434/266 |
| 4,167,070 A | * | 9/1979 | Orden | G09B 23/32 434/272 |
| 4,966,139 A | | 10/1990 | Swiatosz | |
| 5,520,192 A | | 5/1996 | Kitney | |

(Continued)

OTHER PUBLICATIONS

Krug Life Sciences, Inc., Computerized Variable Profile Breathing Simulator Model KLS03-PHNX-CVPBS-MU/SU manual pre-release, Slides 1, 5, 6, 8-12, 14, and 16, published Nov. 20, 1998, available on the internet at https://www.qsl.net/n5agq/manual/sld001.htm.

*Primary Examiner* — Kang Hu
(74) *Attorney, Agent, or Firm* — AFMCLO/JAZ; Jeffrey V. Bamber (57) ABSTRACT

A breathing simulator for simulating the dynamic breathing patterns is disclosed. The breathing simulator may include: a gas holding chamber capable of expanding and contracting having a movable portion for expanding and contracting the gas holding chamber; a motion imparting mechanism operatively connected to movable portion of the gas holding chamber; a motion control device for controlling the expansion and contraction of the gas holding chamber; and a motion controller in communication with the motion control device. The motion controller includes software thereon, wherein the software contains an algorithm that express the motion of the movable portion of the gas holding chamber in terms of the equations for a circle in a Cartesian coordinate system, wherein the algorithm provides a mathematically-based breathing profile that is executed by the motion control device.

6 Claims, 11 Drawing Sheets

(56) References Cited

U.S. PATENT DOCUMENTS

| | | | | |
|---|---|---|---|---|
| 5,584,701 | A * | 12/1996 | Lampotang | G09B 23/285 |
| | | | | 434/262 |
| 5,779,484 | A * | 7/1998 | Lampotang | G09B 23/28 |
| | | | | 434/266 |
| 6,106,479 | A | 8/2000 | Wunderlich et al. | |
| 6,910,896 | B1 | 6/2005 | Owens et al. | |
| 6,921,267 | B2 * | 7/2005 | van Oostrom | G09B 23/288 |
| | | | | 434/262 |
| 8,585,412 | B2 * | 11/2013 | Jafari | G09B 23/288 |
| | | | | 434/262 |
| 2004/0110117 | A1 | 6/2004 | van Oostrom et al. | |
| 2007/0259322 | A1 | 11/2007 | Yuasa et al. | |
| 2015/0217074 | A1 * | 8/2015 | Wells | A61M 16/0672 |
| | | | | 128/207.18 |

* cited by examiner

| | |
|---|---|
| (1) | Perform System Checks and Calibrations |
| (2) | Set Desired Waveform Type & Parameters |
| (3) | Set Acceleration (Smoothness of Motion) |
| (4) | Set Speed of Movement (Rate of Air Flow) |
| (5) | Set Distance of Movement (Volume of Air) |
| (6) | Set Direction of Rotation (Direction of Air Flow) |
| (7) | Set Cycle Timing (Inhale, Exhale, Pauses) |

DYNAMIC BREATHING SIMULATOR

Pursuant to 37 C.F.R. § 1.78(a)(4), this application claims the benefit of and priority to prior filed Provisional Application Ser. No. 63/231,348, filed Aug. 10, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to breathing simulators, and more particularly to dynamic breathing simulators.

BACKGROUND OF THE INVENTION

Breathing is a vital function for our survival and typically we do not notice it unless we are breathing heavy or gasping for air. Breathing rates and volumes vary dynamically based on internal and external factors including body composition, activity levels, physical conditioning and environment. Just like a fingerprint, actual breathing plots tend to be somewhat unique from breath-to-breath and person-to-person. Over the years, various breathing machines have been created to produce profiles that are generally accepted as representative and sufficient for most applications.

Various machines are available which generate basic sinusoidal waveforms to approximate human breathing. Some of these machines, such as the Krug breathing machine, use a mechanical approach with a ball-screw driven bellows controlled by a servo motor. Historic evidence supports the utilization of look-up tables to provide a series of waveguide points for the basic wave motion. This technique tends to be limited in supporting real-time waveform changes.

Available breathing machines appear to be limited in a couple areas. One inherent limitation with existing breathing machines is that they tend to be static in nature. Breathing machines are often set at one specific steady-state flow setting (i.e. 60 LPM and 12 BPM) and require operator intervention to change to new flow setting. As people are doing different activities, their breathing rates can change rapidly in a short period of time. When replicating all the system parameters, such as during an advanced tactical mission, it becomes very important to have a great deal of precision and rapid response to accurately capture these dynamic changes.

In light of recent challenges associated with military pilots experiencing hypoxia-like incidents, there has been a concentrated attempt to advance the state of the art with regard to understanding and optimizing the dynamic nature of the human performance within realistic tactical environments. As a practical consideration, these efforts require high fidelity simulations of all the associated system components, including the pilot breathing.

A need, therefore, exists for improved breathing simulators that are able to expand the options available to simulate human breathing patterns under dynamic conditions.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

In one embodiment of the present invention, a breathing simulator for simulating dynamic breathing patterns is provided. The breathing simulator comprises:

a gas holding chamber capable of expanding and contracting, the gas holding chamber having a cross-sectional area and a movable portion for expanding and contracting the gas holding chamber, the gas holding chamber being in gas communication with a source of gas (air or oxygen);

a motion imparting mechanism operatively connected to the movable portion of the gas holding chamber;

a motion control device for activating the motion imparting mechanism and controlling the expansion and contraction of the gas holding chamber using the motion imparting mechanism; and a motion controller in communication with the motion control device, wherein the motion controller has software thereon (or which is associated with the motion controller), wherein the software contains at least one algorithm, wherein the at least one algorithm provides a mathematically-based breathing profile that is executed by the motion control device, wherein one algorithm determines the motion of the movable portion of the gas holding chamber in terms of the equations for a circle in a Cartesian coordinate system, and performs the following steps after the desired breathing pattern is input into the motion controller:

determines at any given time whether to expand or contract the gas holding chamber to control the direction of air flow into or out of the gas holding chamber based on the position of rotation (of a point) around the circumference of the circle;

determines at any given time how much to expand or contract the holding chamber in order to control the volume of air flowing into or out of the holding chamber based on the distance the movable portion of the holding chamber is moved multiplied by the cross-sectional area of the holding chamber;

sets a circular velocity comprising a speed at which a point moves around the circle to establish the peak air flow to or from the air holding chamber;

establishes a distance around the circle (circumference) and determines the amount of time it takes to complete one full transit (complete waveform cycle) to provide the time for each complete breath (inhale and exhale); and determines at any given time, the acceleration of a point traveling around the circle to establish the smoothness of motion of a breathing profile.

The circular equations provide sinusoidal waveforms. In other embodiments, other algorithms and/or data may provide other waveforms types.

A method of simulating the breathing patterns of a mammal is also provided herein.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to breathing simulators, and more particularly to dynamic breathing simulators.

Prior Breathing Simulators

Within the commercial market, various techniques are utilized to generate air flow which has been associated with human breathing patterns. Machines are available which generate basic sinusoidal waveforms to approximate human breathing. Some of these machines, such as the Krug breathing machine from Krug Life Sciences, Inc. shown in FIG. 1, use a mechanical approach with a ball-screw driven bellows.

Figure 1:
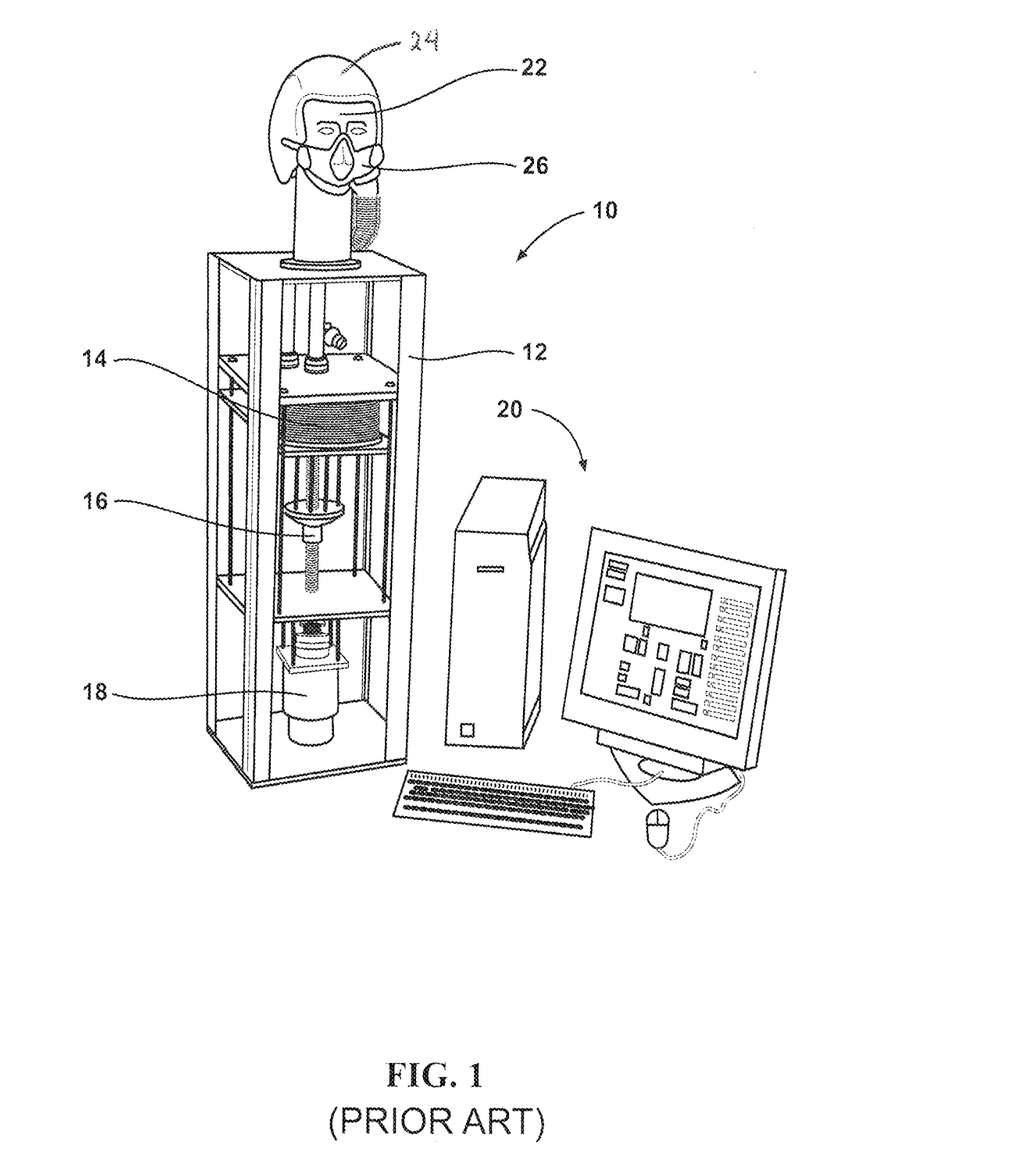
FIG. 1 is a perspective view of a prior art breathing simulator.

FIG. 1 shows that the Krug breathing machine 10 comprises an open shelf-like frame 12 with several compartments. A typical breathing machine might be constructed with an air cavity which is partially filled and emptied to produce inhale and exhale air flow in a cyclical fashion. The mechanism might include an air cylinder, diaphragm, or bellows 14 (such as a ball-screw 16 driven bellows) which can be controlled by various means such as a pneumatic device, a stepper motor, or servo control motion techniques. The Krug machine 10 uses a servo motor 18. A computer 20 can be connected to the machine. Although not part of the machine, but on top of the machine in FIG. 1 is a manikin head 22 representing that of a military pilot with a helmet 24 and oxygen mask 26 that may be used to simulate the breathing of a pilot wearing an oxygen mask.

Figure 2A:
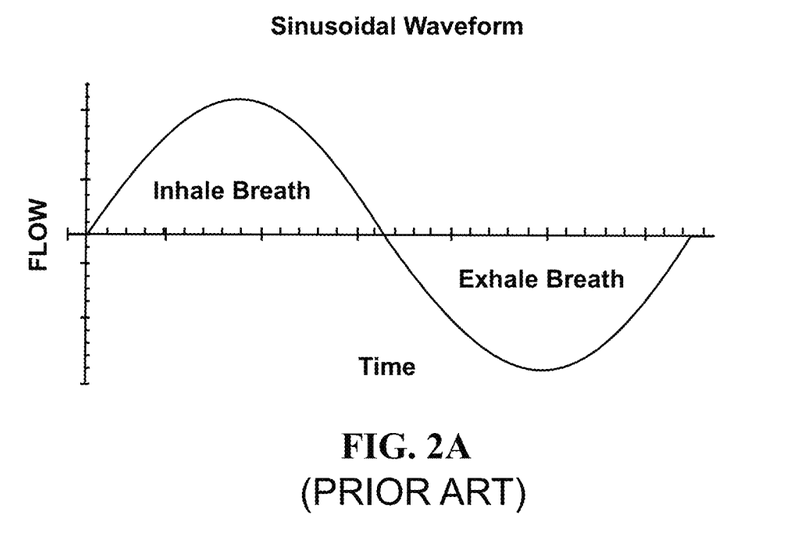
FIG. 2A is a graph of a standard prior art sinusoidal breathing pattern waveform.
Figure 2B:
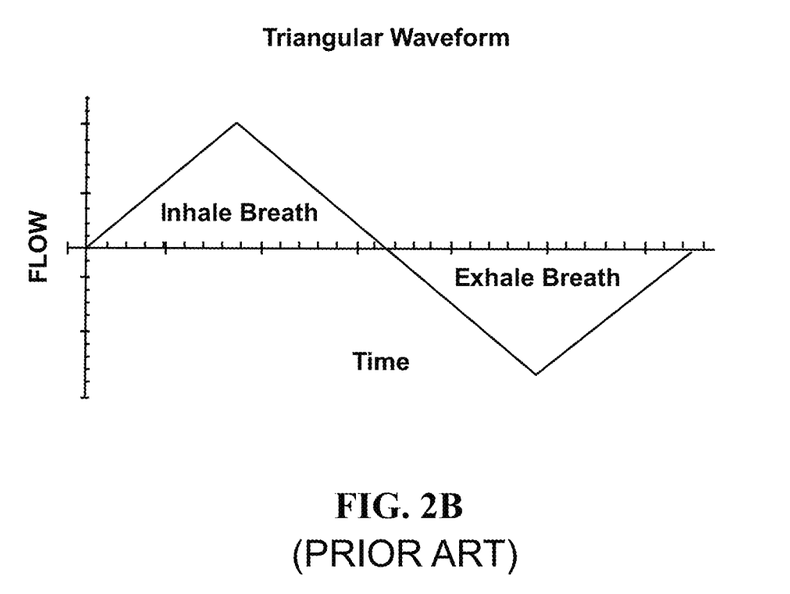
FIG. 2B is a graph of a standard prior art triangular waveform.

Machine generated breathing waveforms can take multiple formats including sinusoidal (FIG. 2A) and triangular (also referred to as "saw tooth") (FIG. 2B). The triangular waveform involves a simple movement up and down of the air cylinder at the same speed in each direction, and may be useful for calibration of the breathing machine. Sinusoidal waveforms are typically associated with approximating human breathing profiles. From a motion control perspective, achieving sinusoidal air flow in a breathing machine is challenging due to the continuous changing of acceleration parameters in order to create a smooth outcome. This has previously required the utilization of look-up tables to provide a series of waveguide points for the basic wave motion. This technique tends to be limited in supporting real-time waveform variations. The main limitation of standard breathing machines is found in the lack of ability to handle real-time dynamic variations and sub wavelet components (independent inhale/exhale, linear flow, and no flow sections) which are found in actual breathing data.

More specifically, although standard breathing machines can replicate "pure sinusoidal" waveforms, it appears as if there are few, if any, machines available which are able to produce blended waveforms which represent actual dynamic breathing patterns generated by humans.

Another limitation is the process used to generate the waveform. The use of a look-up table to generate wave points over time tends to limit the range and scalability of the waveforms. Look-up tables are inherently more cumbersome to store, retrieve or modify than a mathematical based approach. A stronger solution is needed in order to have a waveform produced by a process where a few variables are changed and results are instantaneously realized.

A third limitation is the very nature of the industry accepted waveforms themselves. Human breathing tends to be more complicated than the approximated sinusoidal waveforms. The reference standards need to more accurately represent human breathing. Inhale waveforms typically tend to be a flattened (more linear at top) waveform and exhale profiles tend to be longer in duration than the inhale with a heavier air flow followed by a more gradual tapering off before the next inhale starts. While speed of transition and scalability of the outputs of current methods present challenges for the system user, the biggest deficiency is the lack of component detail embedded in the wave.

Tactical aircraft flight conditions can change rapidly, and pilot breathing patterns are influenced by the real-time stimulus. In addition to rapidly changing scenarios, a fighter pilot may need to consciously invoke complicated (trained) breathing patterns in order to avoid unconsciousness, avoid injury or survive certain maneuvers. High fidelity tracking of actual human breathing requires a system which can adjust its outputs in a near real time fashion (in a fraction of a second) while also allowing for a seamless blending of non-sinusoidal excursions. In fact, it becomes apparent that even inhale profiles can differ significantly from exhale profiles. In order to effectively reproduce advanced breathing patterns, the breathing pattern simulation should include features such as dynamic adjustments to the sinusoidal waveforms, sections of linear flow, sections of no flow, and decoupled inhale from the exhale sections of a waveform.

Breathing Simulator of the Present Invention

The present invention addresses the need to replicate high fidelity breathing waveforms by creating blended waveforms which exceed industry standard sinusoidal waveforms.

A. Mechanical/Electronic Components

Figure 3:
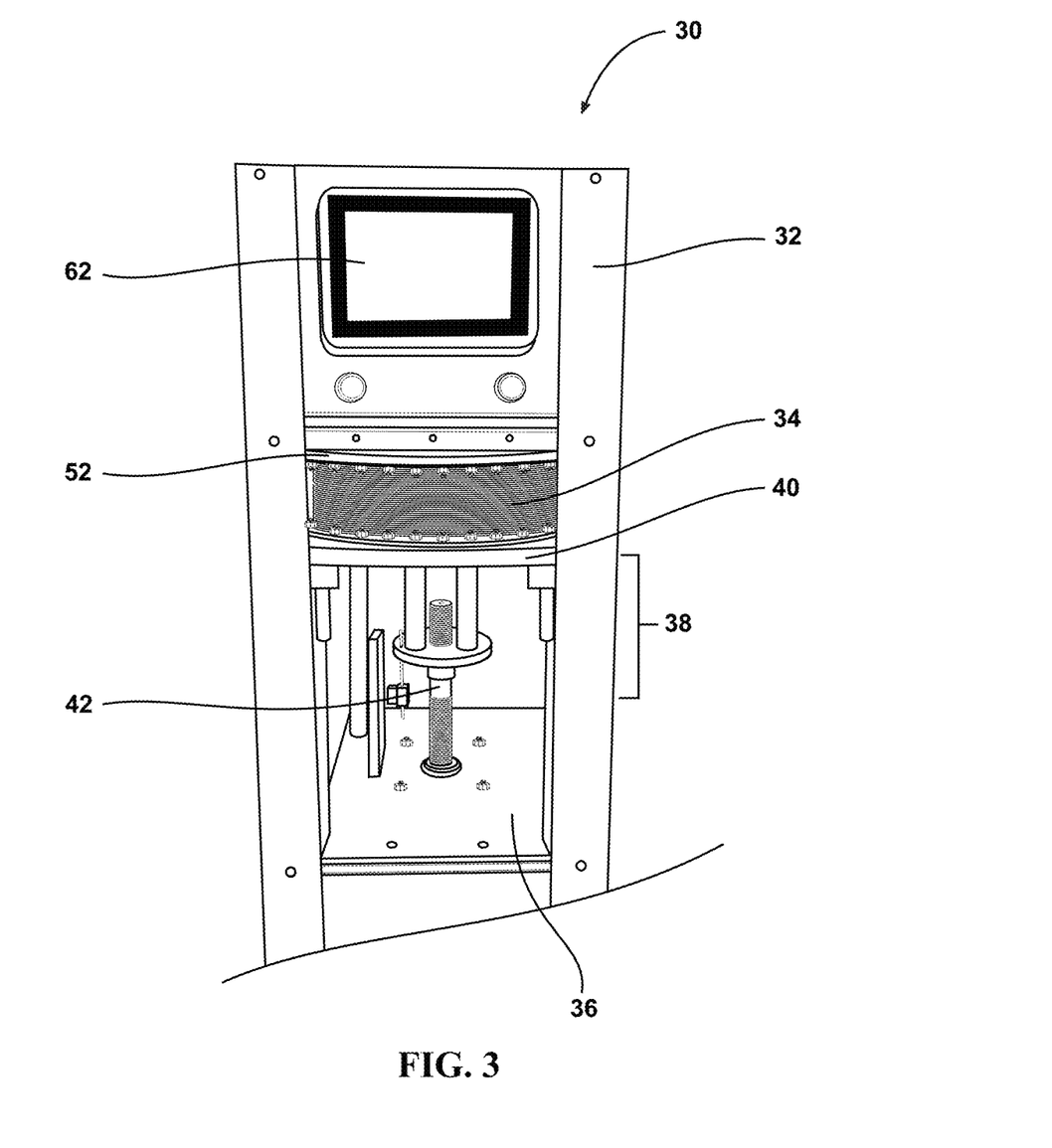
FIG. 3 is a perspective view of one embodiment of the breathing simulator of the present invention.
Figure 4:
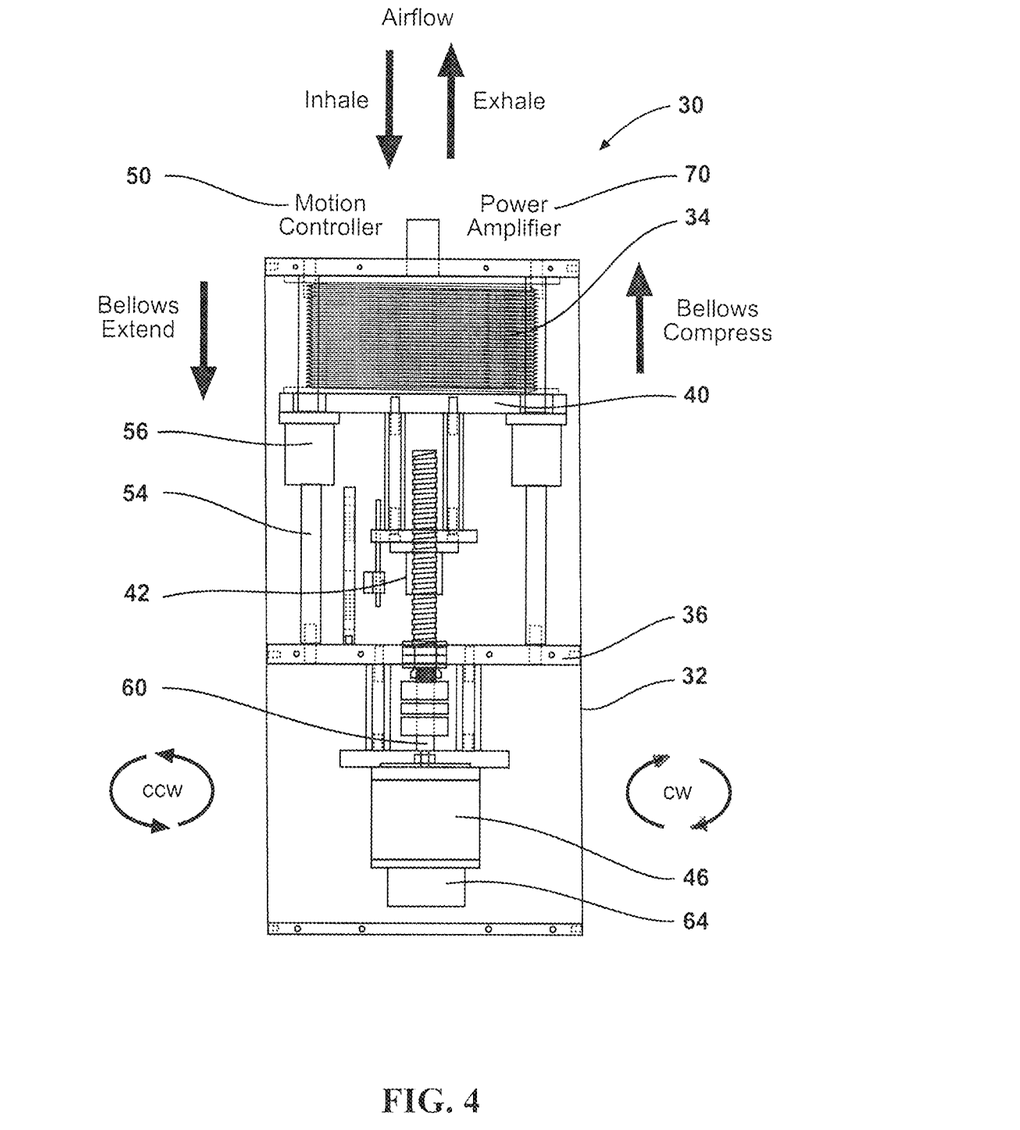
FIG. 4 is a front view of part of one embodiment of the breathing simulator of the present invention.

FIGS. 3 and 4 show that in one embodiment, the breathing simulator 30 of the present invention may generally comprise: a housing 32 which may be in the form of a frame with shelves; an air (or gas) holding chamber 34; a stationary platform 36; a moving assembly 38 which may comprise a movable portion (such as a movable plate) 40 for expanding and contracting the gas holding chamber 34; a motion imparting mechanism 42 (such as a ball screw) that is operatively connected to the movable plate 40; a motion control device (such as a precision motor) 46 (FIG. 4) that provides rotational motion for expanding and contracting the gas holding chamber 34 using the motion imparting mechanism 42; and a motion controller 50 in communication with the motion control device 46 for controlling the movement of the motion control device 46.

The gas holding chamber (or simply "holding chamber") 34 can comprise any suitable type of air tight chamber that is capable of holding a volume of gas, which chamber is capable of expanding and contracting. The gas holding chamber 34 may include, but not be limited to: a linear actuator, an air cylinder (a pneumatic cylinder), a diaphragm, or a bellows. In the embodiment shown, the gas holding chamber 34 is a bellows. In the embodiment shown, the movable plate 40 is joined to the bottom of the bellows 34, and a stationary plate 52 is joined to the top of the bellows. In other embodiments, the gas holding chamber 34 can be in the form of a cylinder with a movable piston therein. The gas holding chamber, bellows 34, is in gas communication with a source of gas (air or oxygen). The source of air or oxygen may comprise various concentrations of oxygen (including 100%). It should be understood that all references to "air" flow, and the like, herein can include various concentrations of oxygen including, but not limited to 100% oxygen.

The gas holding chamber, such as bellows 34, has a cross-sectional area. The bellows 34 may be sized to replicate the human lungs. Even though the average lung capacity is about six liters of air, an average breath is only about a half liter. In one non-limiting embodiment, the bellows 34 has an inner diameter of 9.5 inches and an outer diameter of 11 inches, which yields an average diameter of 10.25 inches. The bellows 34 has a maximum expansion of 5.5 inches and a minimum compression of 2.0 inches. With system safety limits, this yields a maximum stroke of 3.0 inches. The bellows 34 in this design will hold more than seven liters, but the useful stroke (representing the maximum inhale or exhale) is about four liters. The airflow volume can be determined by calculating the volume of a cylinder in which the average diameter is used to calculate the area of a circle, which is multiplied by the stoke length to give the volume of the cylinder.

The bellows 34 may be made from any suitable material, such as rubber or nylon. In some cases, however, it may be desirable to place the breathing machine 30 in a pressurized environment to simulate the conditions in an aircraft cockpit. In such cases, the bellows 34 may be made from stainless steel so that it does not collapse under such conditions.

The motion imparting mechanism 42 can be any suitable device that is capable of translating the rotational motion of the motion control device (e.g., the precision motor) 46 into linear motion in order to move the movable plate 40 to expand and contract the gas holding chamber 34. The motion imparting mechanism 42 can comprise a linear actuator, such as a ball screw, an acme screw, or a pneumatic control that is operatively connected to the movable plate 40 of the gas holding chamber (e.g., bellows) 34. In the embodiment shown, the movable plate 40 moves while riding on precision rails 54 via linear bearings 56. The breathing simulator 30 may also comprise limit switches to limit the upward and downward motion of the bellows 34, and to provide a "home" position for the motion control device (e.g., the precision motor) 46.

The motion control device 46 shown in FIG. 4 can comprise any type of device that is suitable for controlling the expansion and contraction of the gas holding chamber 34. In some cases, the motion control device 46 may be a precision motor. The term "precision", as used herein with reference to the motor refers to a motor that has the ability to consistently repeat a desired motion. The position of the motor can, thus, be commanded or controlled to move to a certain location. The precision motor 46 may comprise one of the following: a pneumatic device, stepper motor, or a servo motor. In the embodiment shown in the drawings, the precision motor 46 comprises a servo motor. The linear motion of the motion imparting mechanism, ball screw 42 is linked to the servo motor shaft 60 by means of a die set bearing and a shaft coupling 44. The servo motor shaft 60 and ball screw 42 are configured to rotate either clockwise (CW) or counterclockwise (CCW) at a given point in time.

In this embodiment, five revolutions of the motor shaft 60 yields one inch of linear travel at the bellows 34. A known type of servo encoder 64 (FIG. 5) may be provided to detect the position of the motor shaft 60 which in turn indicates the relative position of the ball screw 42 travel. Any suitable servo encoder can be used. In this particular embodiment, the encoder 64 has a resolution of 8,192 counts per revolution.

The motion controller (or simply the "controller") 50 is in communication with the motion control device 46. The motion controller 50 has software thereon which contains an algorithm, wherein the algorithm provides a mathematically-based breathing profile that is executed by the motion control device 46. The motion controller 50 can be any suitable type of device that is capable of controlling the motion control device 46. The motion controller 50 may also be capable of running other processes and system features of the breathing simulator 30. The motion controller 50 can be a single or multiple axis motion controller. An example of a single axis motion controller is the Galil DMC-31011 motion controller available from Galil Motion Control of Rocklin, CA, U.S.A. In one embodiment, the motion controller is a Galil DMC-4020 four axis motion controller. In the embodiment shown in FIG. 4, the motion controller 50 is in the form of a box that may be placed on top of the housing 32 of the breathing simulator below the manikin head, but it can be located anywhere as long as it is in operative communication with the motion control device 46.

Figure 5:
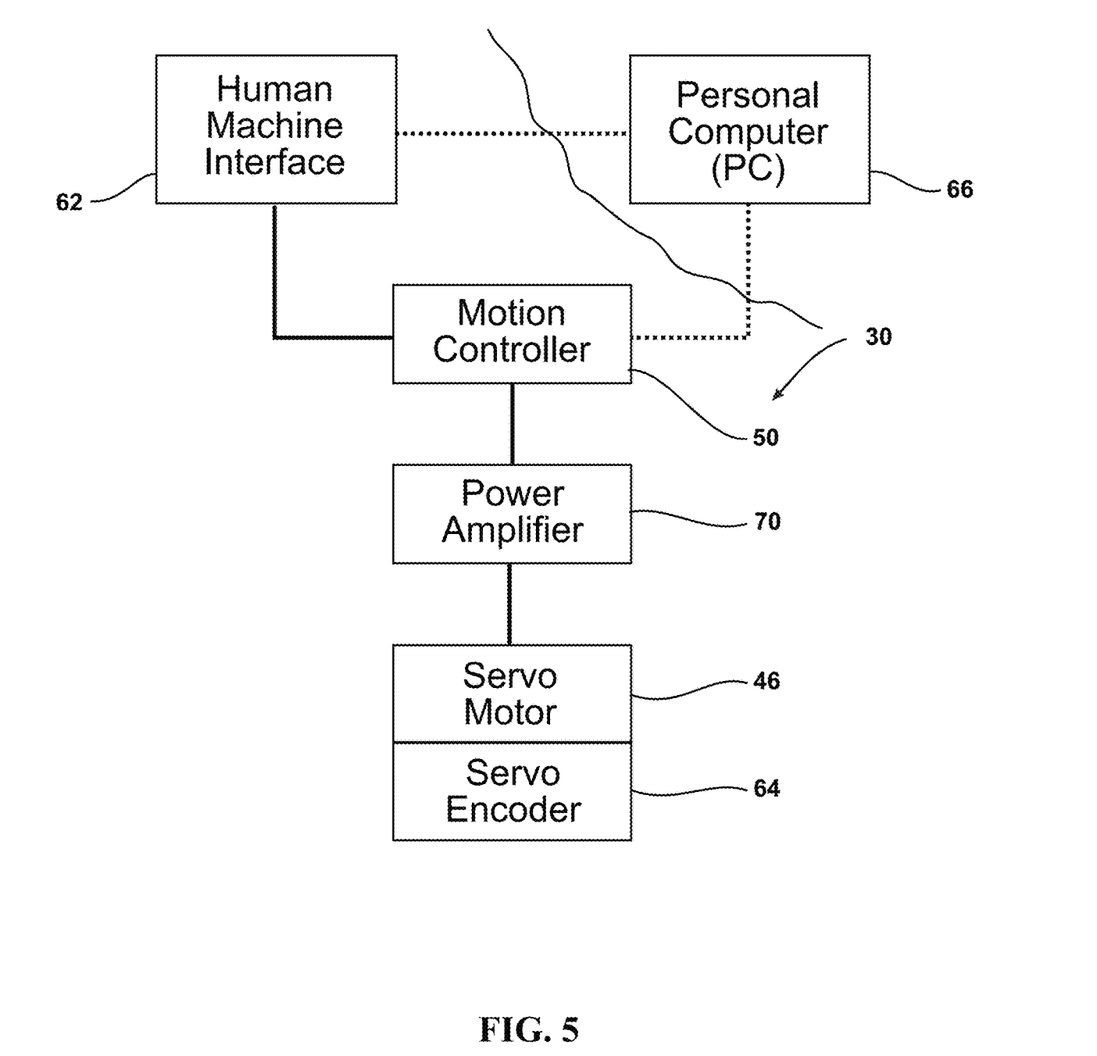
FIG. 5 is a block diagram showing the interconnections between the various components of the breathing simulator.

FIGS. 3 and 5 show that the breathing simulator 30 may also comprise a human machine interface, such as in the form of a screen 62

FIG. 5 shows that a separate computer 66 can optionally be linked to the breathing simulator 30 to provide further analysis and visualization of the breathing patterns. Such a computer 66 can comprise a personal desktop or laptop computer (PC). The computer 66 can be used as a developer interface and/or as a terminal to access changes to the breathing waveform. As shown in FIG. 5, the computer 66 can be in operative communication with the human machine interface 62 of the breathing simulator 30 and with the motion controller 50. The computer 66 can have a screen that serves as the human machine interface for the computer.

In addition to the components listed in the prior paragraphs, the breathing simulator 30 may comprise a power amplifier 70 (to convert low power control signals into higher power servo motor drivers) and sensors. As shown in FIG. 5, the power amplifier 70 may be in operative communication with the motion controller 50 and the servo motor 46, and may convert signals from the motion controller before they are sent to the servo motor 46.

Although not part of the breathing simulator 30 of the present invention, the breathing simulator 30 may have a manikin head 22 representing that of a military pilot with a helmet 24 and oxygen mask 26 placed on top of the machine (similar to that of the prior art machine 10 shown in FIG. 1) that may be used to simulate the breathing of a pilot wearing an oxygen mask. When the breathing simulator 30 of the present invention is used in a pressurized environment, it may be desirable for the manikin head is made of solid brass so it will not collapse.

B. The Algorithm(s)

The motion controller has software thereon, and the software contains or comprises at least one algorithm which provides a mathematically-based breathing profile that is executed by the motion control device. The algorithm(s) determine the motion of the movable portion of the gas holding chamber. At least one algorithm is a "sinusoidal algorithm" that determines the motion of the movable portion of the gas holding chamber in terms of the equations for a circle in a Cartesian coordinate system. There may be additional algorithms, such as to create linear motion and/or to adjust real data inputs. The present invention adjusts the motion parameters of the breathing simulator 30 using a scalable technique to smoothly change speed and accelerations to keep the system from having abrupt motion segments and yet allow for dynamic changes to the breathing patterns being simulated.

In a first embodiment, the approach involves motion control using mathematical equations for a circle with real and virtual components to replicate standard sinusoidal waveforms to provide a more efficient technique than the established look-up table approach. It provides the dynamic ability to change on the fly while also providing scalable and repeatable reference waveforms. The equation for a circle can be combined with linear equations to provide many wave forms.

Figure 6:
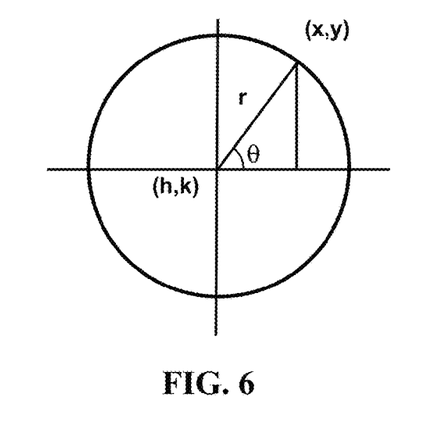
FIG. 6 is a drawing of a circle showing two possible ways of defining the circle in a Cartesian coordinate system.

The algorithm, as stated above, is based upon the mathematical equations for a circle. A circle is used to generate smooth motion (expansion and compression) at the bellows output which is controlled by the rotation of the servo motor shaft. The equation for a circle in a Cartesian coordinate system, as shown in FIG. 6, is:

$(x-h)^2+(y-k)^2=r^2$, where:

(x, y) is any point on the circle
(h, k) is the center of the circle, and
r is the radius of the circle.

Another way to define the points associated with a circle is to consider which points simultaneously satisfy both of the following equations:

$x=r\cos(\theta)$ and $y=r\sin(\theta)$, where $\theta$ is the angle subtended by the point at the circle's center.

Applying the circular concept to a robotic system typically would require a two-axis system, one for both the sine and cosine components. Instead of using a two axis system, one with a sine component and the other with a cosine component, however, the present system can treat one axis as virtual and the other real. This allows the use of a two axis equation with a one axis system.

Therefore, in the case of the control of the bellows 34 by the servo motor 46, both a real axis and a virtual axis are supported. The real axis is what is seen. The virtual axis is behind the scenes, but is needed to create the algorithm. The first component of the circle drives an amplifier and servo motor 46 in a sinusoidal fashion. The cosine component is sent to a virtual axis. In practical terms, this type of motion provides gradual acceleration and decelerations to create continuously smooth bi-directional air flow and yet still can be adjusted mathematically for purposes of rapid changes, scaling, and other permutations.

Figure 7:
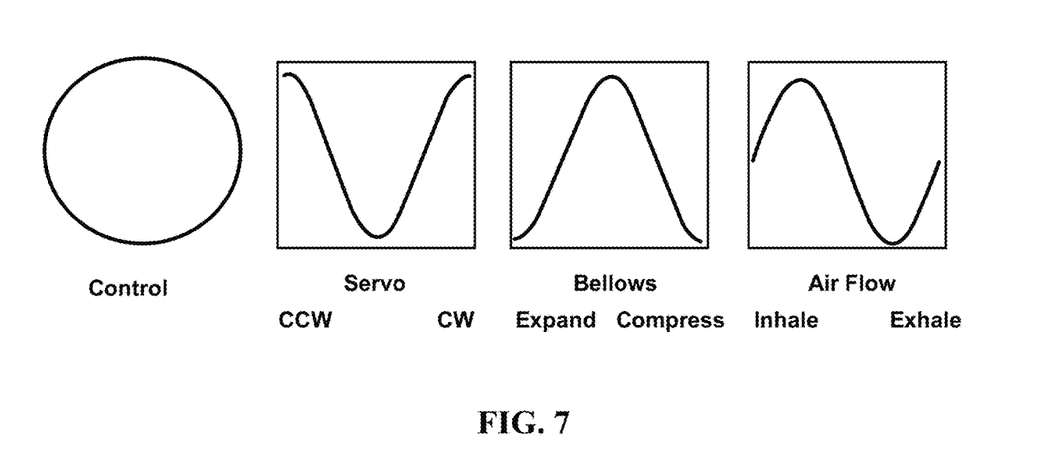
FIG. 7 is a diagram that shows how the control system, when considered to be related to motion relative to one revolution around a circle, relates to: the rotation of a servo motor; the expansion and compression of a bellows; and the type of air flow produced by the device (inhale and exhale).

FIG. 7 shows how the control system, when considered to be related to motion relative to one revolution around a circle, relates to: the direction of rotation of a servo motor; the expansion and compression of a bellows; and the type of air flow produced by the device (inhale and exhale). Inherent with the circular motion profile, there are two main variables or components to consider: speed and distance traveled. Speed around the circle (circular velocity) can be linked at the motor end, to shaft rotational speed and is measured in encoder counts per second or revolutions per minute. Speed around the circle can also be linked at the bellows end, to the peak air flow which is measured in liters per minute (LPM). It was initially thought that speed around the circle would be related to breathing frequency and so it was surprising to find that this circular velocity is, in fact, related to peak air flow. Likewise, it is also interesting to note that the distance around the circle was found to relate to the breathing frequency. Distance around the circle (circumference) can be linked at the motor end, to shaft rotational distance and is measured in encoder counts. Distance around the circle can also be linked at the bellows end, to the volume of gas exchanged. Adjusting the circumference of the circle, by changing its radius, varies the physical distance travelled (bellows stroke length). Changing the motor shaft direction (counterclockwise or clockwise), serves to vary the expansion (inhale portion) or contraction (exhale portion) of the bellows (FIG. 7). The total distance travelled determines the actual volume of gas exchanged per wave cycle. Motion resulting from the combination of the circular speeds and distances creates waveform characteristics which simulate actual breathing profiles. The full transit cycle time provides a measure of frequency of breaths per minute (BPM). The equations provide links between the servo performance and the air volume/flow rate.

Figure 8:
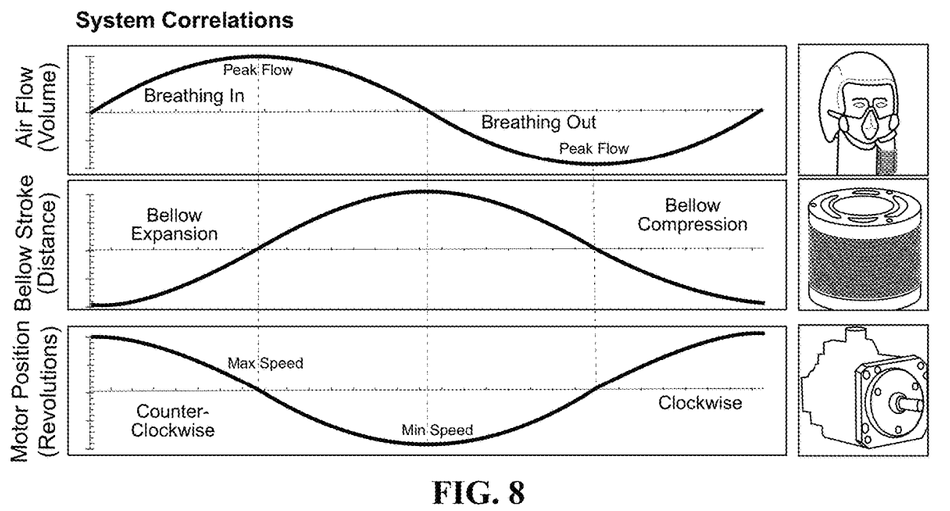
FIG. 8 is a diagram that shows the correlations that occur at various points in time during the operation of the device between the air flow, expansion and compression of the bellows, and revolutions of the motor.

FIG. 8 shows phased relationships between key components of the control system as seen over time for a typical sinusoidal waveform generated using the real axis of the circular algorithm within the motion controller. This diagram that shows the correlations that occur at various points in time during the operation of the device between the air flow, expansion and compression of the bellows, and revolutions of the motor.

Figure 9:
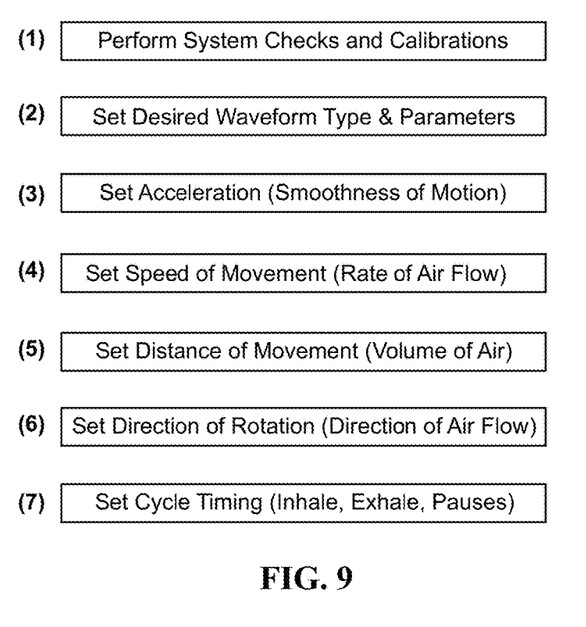
FIG. 9 is a flow chart showing steps of the method which are used to create desired motions and hence generate corresponding waveforms.

FIG. 9 is a flow chart showing system settings and the linkage to motion and waveform generation. It should be understood that not all of the steps described herein are mandatory, and the steps may be performed in any suitable order. As shown in FIG. 9, the steps may involve an initial step (1) of internal calibration and set-up of the breathing simulator. Step (2) allows for the inputting of the type of motion desired with its associated performance parameters. Given a particular wave profile, motion parameters are then calculated which could produce that desired waveform. In step (3) the acceleration profile is set which establishes the smoothness of the motion profile. Speed of movement is generated in step (4) which influences the rate of air flow. Step (5) involves setting the distance of movement of the movable plate 40 or bellows stroke length to match the desired volume of air. Step (6) involves setting the direction of rotation of the output of the motion control device 46, (e.g., servo motor shaft). This determines whether the movable plate 40 moves upward or downward, and thus establishes the direction of air flow. Step (7) allows for some degree of custom modifications to a desired wave profile and may influence settings in other steps. In at least some embodiments, the operator will provide the input values for steps (2) and (7), and the algorithm will carry out the remaining steps in the background.

C. Modes of Operation

The machine has several modes of operation which include producing standard, blended and custom waveforms. The breathing simulator employs the use of industry standard options combined with custom wavelet building blocks to facilitate multiple operational scenarios.

The standard mode, based on mathematical algorithms, supports legacy and future research by generating reference waveforms such as traditional sinusoidal, triangular or trapezoidal patterns. The first mode of operation produces these industry standard waveforms which are repeatable, scalable and dynamic using mathematical algorithms. This mode includes the option to generate at least three different standard patterns which include a purely sinusoidal waveform, a triangular or saw tooth style waveform, and a trapezoidal waveform. The purely sinusoidal version in FIG. 2A is currently accepted as an industry standard breathing pattern and provides reference for data validation and comparison.

Figure 11:
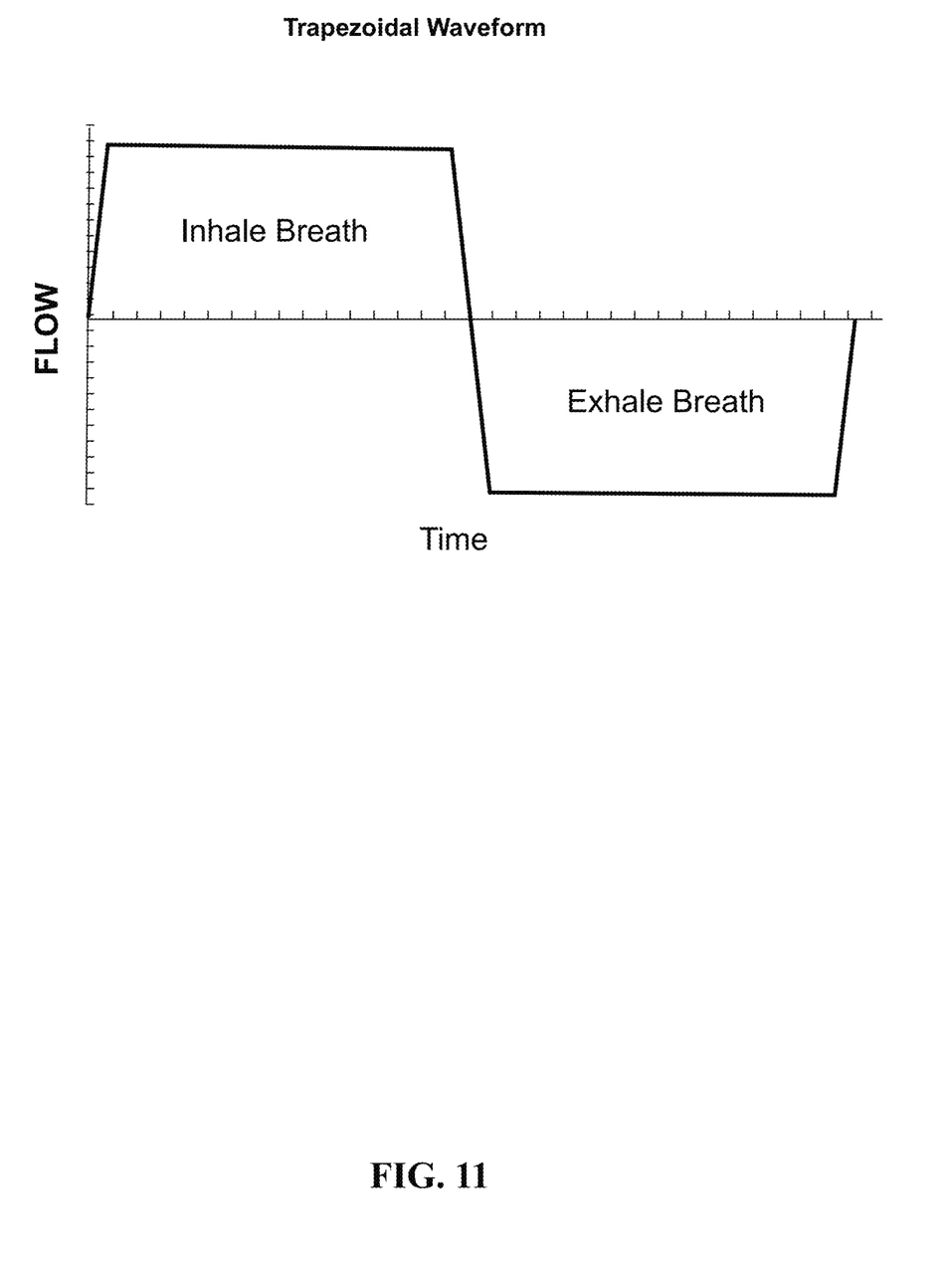
FIG. 11 is a graph of a trapezoidal waveform.

The triangular waveform in FIG. 2B provides a consistent series of inclines and declines but has abrupt peak transitions which are noticeable in the flow data. The trapezoidal waveform in FIG. 11 is similar to the triangular waveform but includes a steady slew at the top and bottom of each of the inclines and declines. The transitions for the trapezoidal waveform are less abrupt than realized with the triangular waveform. The standard mode provides flexible algorithms to create normal waveforms in a highly dynamic fashion. Since the waveforms are mathematically generated, changes can be made on the fly to these breathing patterns by changing parameters such as the radius or speed of the motion. Elements of these standard algorithms are also utilized to build other waveforms which are associated with the other modes of operation.

Figure 10A:
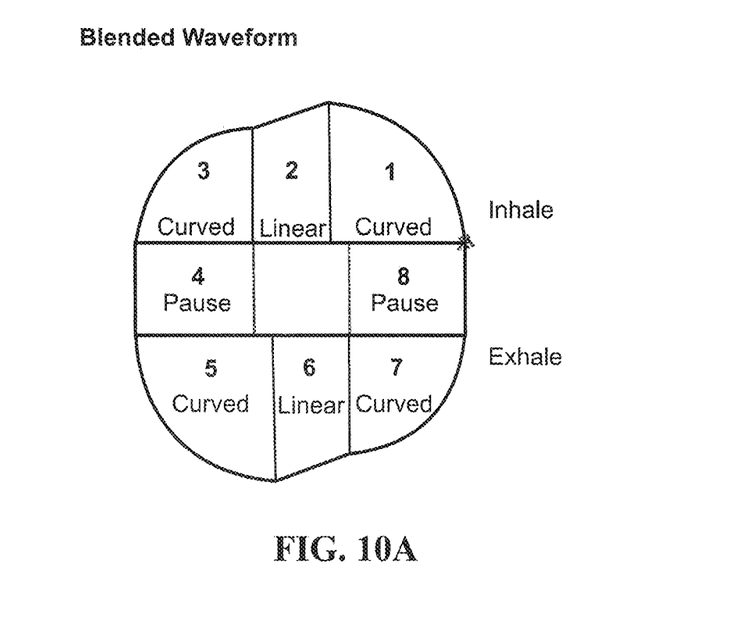
FIG. 10A is a drawing showing how the configuration of a circle can be modified to produce a blended waveform.
Figure 10B:
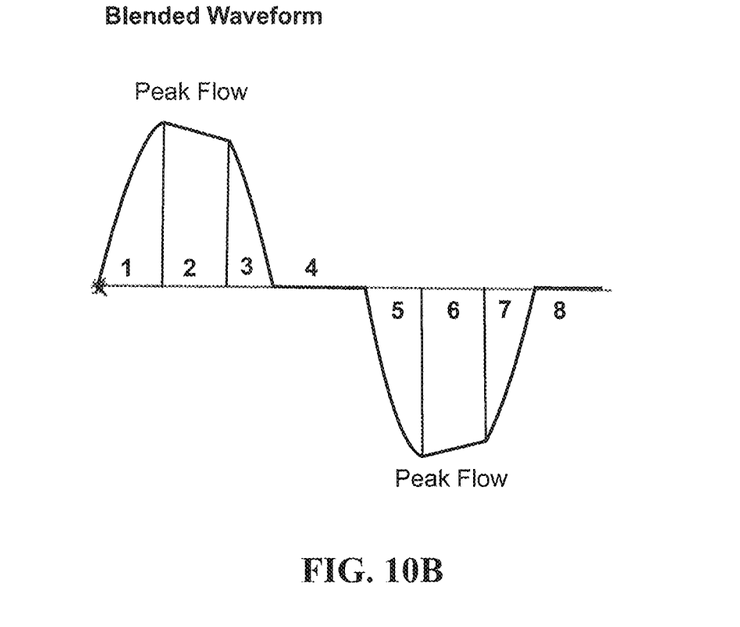
FIG. 10B is a graph showing the blended waveform created by operating the breathing simulator using the modified circle configuration shown in FIG. 10A.
Figure 10C:
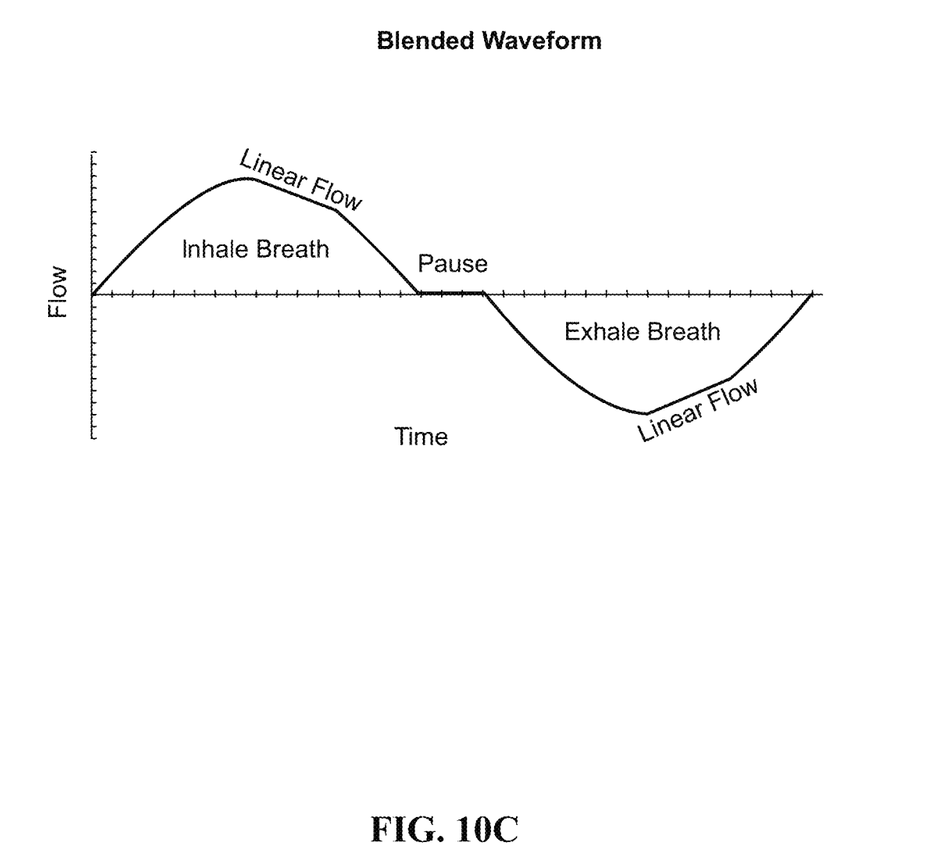
FIG. 10C is a graph of a breathing pattern in the configuration of a blended waveform.

The second mode of operation (the blended mode) creates waveforms using predefined building block wavelets and strategic pauses. This mode allows for the creation of somewhat unique breathing patterns which can approximate real data by means of having the curved parts of sine waves blended with the straight or sloped linear sections and blended with pauses. Once the blended waveform is created, it can be repeated or scaled based on the algorithms used to create the building blocks. For example, FIGS. 10A-10C show that the initial sinusoidal flow algorithms can be integrated with other algorithms to provide advanced building blocks which create non-standard waveforms with strategic pauses and linear sections of travel. The system and method of the present invention provides a great deal of flexibility in producing breathing patterns. For example, not only can the pure waveforms (as seen in the standard mode) be changed on the fly, but also the blended waveforms can be adjusted via a few key variables with instantaneous results. Pauses in the breathing pattern can be inserted by providing a period of time in which there is no motion of the motion imparting mechanism. Linear sections can be inserted into the sinusoidal breathing pattern by transitioning out of the sinusoidal pattern, and inserting a linear segment. Transitions can be made, for example, at any 90° segment around the circle. Transitions can occur extremely quickly (e.g., in less than 50 milliseconds). These unique control algorithms which mathematically allow dynamic permutations to the individual waveforms, represent an important step toward simulating dynamic breathing patterns.

Figure 12:
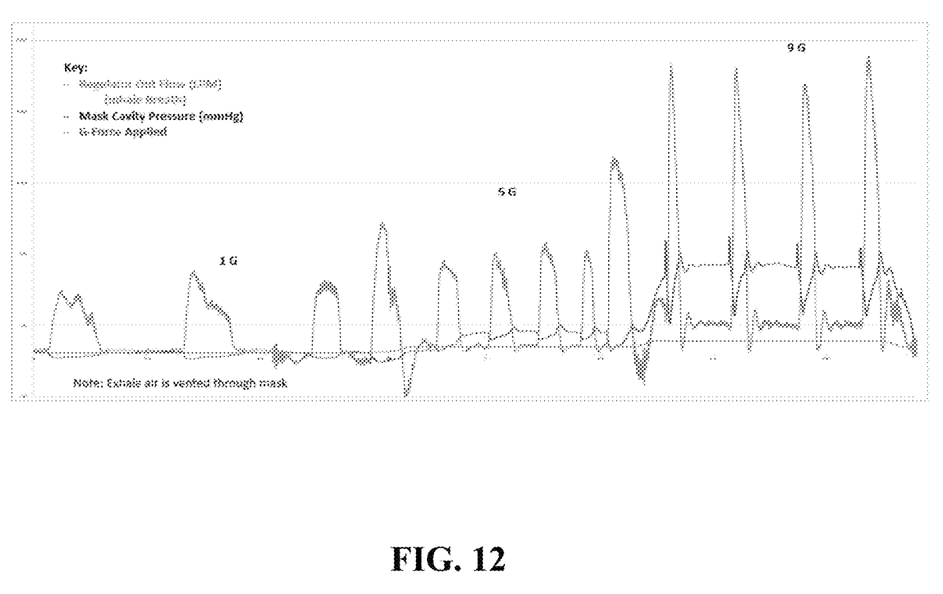
FIG. 12 is a graph showing how the breathing pattern of a pilot may vary when the pilot is subjected to increased G forces.

The third mode of operation (the custom mode) provides an opportunity for researchers to further explore unique breathing patterns which are created via a combination of external data sources and internal algorithms. Actual breathing signatures vary from breath-to-breath and can change drastically depending on the physical activity or state of being. Imported data which is integrated with the breathing machine algorithms can simulate a given scenario and provide insight into a particular time or event. Sometimes the breathing data may be lacking key components. In this case, part of the waveform can be real (based on data inputs) and the other part can be simulated (based on algorithms). For example, consider breathing data gathered from a pilot while breathing under pressurized air. The exhale portion is often vented and only the inhale data is captured. Inhale breathing data, such as seen with FIG. 12, can be combined with exhale breathing patterns or algorithms to replicate the complete pilot breathing. Operating in the custom mode provides great flexibility for creating special waveforms and at the same time generates a bit more work for the user (gathering and validating data) and is typically not a recommended configuration for standardized waveform generation and testing.

D. Alternative Embodiments

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

Alternative configurations include scaling the mechanical components to create breathing patterns for other research such as on other mammals such as mice, monkeys, etc. Breathing patterns can be generated to facilitate cellular research such as the effects of flow patterns on living tissue. The software is developed for platform specific motion controller but the concepts represented should be able to be ported to another controller. This technology could be used in medical settings where a breathing pattern is recorded and then reproduced for a patient during a procedure. Human research in extreme conditions also may be facilitated with this high fidelity breathing simulator.

In some embodiments, there may be an optional secondary air-tight gas holding chamber that is separate from the gas holding chamber (e.g., bellows 34). In such case, the gas holding chamber 34 may be referred to as the "primary gas holding chamber". The secondary gas holding chamber may have an inlet and an outlet and be in gas communication with the gas holding chamber (e.g., bellows 34). The secondary gas holding chamber may be used to add or remove contaminants, such as particulate matter.

E. Uses of the Invention

The primary problem being solved is to provide high fidelity breathing simulations for advanced pilot performance and life support research. The invention is able to generate industry accepted waveforms which represent standard breathing patterns and is also able to simulate and replicate dynamic breathing patterns over certain intervals as would be generated by pilots during normal flying and high stress (high Gz) maneuvers (e.g., see FIG. 12).

A derivative application may provide closed loop active support of injured warfighters being transported from the heat of a battlefield. Another potential application provides simulations of breathing patterns experienced during medical emergencies such as heart attacks, asthma induced trauma or stroke victims.

The system and method described herein can provide a number of advantages. It should be understood, however, that these advantages need not be required unless they are set forth in the appended claims.

The breathing simulator has at least four characteristics to address the above performance limitations of the prior breathing simulators described herein. The first characteristic is the ability to generate pure mathematical sine waves by decoupling the individual components in an equation for a circle into real and virtual axis motion. The resulting motion is able to be changed on the fly and is very repeatable and scalable.

The second characteristic is that it provides the ability to insert strategic pauses and linear or steady sloping sections in a waveform. In this case, the pure sine wave may be disrupted and linear sections added in a seamless fashion (less than 50 microseconds with transition). This feature allows more complex waveforms to be generated which are very adjustable and repeatable.

The third characteristic is the ability to receive raw data from actual waveforms and replicate breathing patterns from this data. Actual breathing waveforms vary by each breath and this approach is helpful when reproducing known scenarios or flight conditions.

The present invention uses advanced motion control techniques to more closely approximate human breathing waveforms. The motion control techniques use mathematical equations for a circle with real and virtual components. Coupled with the pure sinusoidal waves are subtle distinctions such as independent inhale/exhale waveforms, strategic pauses, extended peak flows, sloped linear slews, and no flow conditions which are integrated in a seamless fashion. It provides the dynamic ability to change on the fly while also providing scalable and repeatable reference waveforms. The motion control algorithms provide blended breathing profiles with curved, straight and steady state components.

The present invention provides a next generation breathing simulation for industry standard and more complex human breathing patterns. It builds upon the standard sinusoidal patterns to include more advanced reference waveforms. It provides high fidelity approach to more closely replicate breathing patterns during normal and medically challenging scenarios. The impact of providing advanced simulations could be significant in advancing the life support systems and hence saving the lives of advanced fighter pilots.

The terms "join", "joined", and "connected", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A breathing simulator for simulating dynamic breathing patterns, said breathing simulator comprising:
    a gas holding chamber capable of expanding and contracting, said gas holding chamber having a cross-sectional area and a movable portion for expanding and contracting the gas holding chamber, said gas holding chamber being in gas communication with a source of gas;

a motion imparting mechanism operatively connected to the movable portion of the gas holding chamber;

a motion control device for activating the motion imparting mechanism and controlling the expansion and contraction of the gas holding chamber using said motion imparting mechanism; and a motion controller in communication with said motion control device, wherein said motion controller has software thereon, wherein said software contains at least one algorithm, wherein said at least one algorithm provides a mathematically-based breathing profile that is executed by said motion control device, wherein one algorithm determines the motion of the movable portion of the gas holding chamber in terms of the equations for a circle in a Cartesian coordinate system, and performs the following steps after the desired breathing pattern is input into the motion controller:

determines at any given time whether to expand or contract the gas holding chamber to control the direction of gas flow into or out of the gas holding chamber based on the position of rotation of a point around the circumference of said circle;

determines at any given time how much to expand or contract the gas holding chamber in order to control the volume of gas flowing into or out of the holding chamber based on the distance the movable portion of the holding chamber is moved multiplied by the cross-sectional area of the holding chamber;

sets a circular velocity comprising a speed at which a point moves around the circle to establish the peak air flow to or from the gas holding chamber;

establishes a distance around the circle and with the velocity determines the amount of time it takes to complete one full transit to provide the time for each complete breath; and determines at any given time, the acceleration of a point traveling around said circle to establish the smoothness of motion of a breathing profile.

2. The breathing simulator of claim 1 wherein said gas holding chamber comprises one of the following: an air cylinder, a diaphragm, or a bellows.

3. The breathing simulator of claim 1 wherein motion imparting mechanism comprises a ball screw, acme screw, or pneumatic device.

4. The breathing simulator of claim 1 wherein the motion control device comprises one of the following: a pneumatic device, stepper motor, or a servo motor.

5. The breathing simulator of claim 1 which is configured:
a) to receive input from an operator in the form of: the desired maximum air flow and number of breaths per minute;
b) to provide an algorithm output in the form of a circular speed and a radius at any given time; and
c) the simulator produces a sinusoidal waveform having an amplitude which represents the peak air flow; and a period which represents the amount of time per breath.

6. The breathing simulator of claim 1 wherein said at least one algorithm is capable of producing the following: standard triangular and sinusoidal waveform breathing patterns, trapezoidal breathing patterns, and blended waveform breathing patterns that comprise portions that are sinusoidal and other portions that are at least one of linear or are pauses in which no air is either drawn in or expelled.

\* \* \* \* \*